United States Patent [19]

Nagase et al.

[11] 3,906,026
[45] Sept. 16, 1975

[54] PROCESS FOR PREPARING ALKYL TRANS-CHRYSANTHEMATE

[75] Inventors: Tsuneyuki Nagase, Takatsuki; Gohu Suzukamo, Ibaragi; Yukio Yoneyshi, Takatsuki; Hirosuke Yoshioka, Ikeda, all of Japan

[73] Assignee: Sumitomo Chemical Company, Limited, Japan

[22] Filed: May 10, 1973

[21] Appl. No.: 358,988

[30] Foreign Application Priority Data

| May 16, 1972 | Japan | 47-48852 |
| May 18, 1972 | Japan | 47-49695 |
| June 5, 1972 | Japan | 47-56258 |
| Mar. 1, 1973 | Japan | 48-25472 |

[52] U.S. Cl. ............ 260/468 H; 260/514 H
[51] Int. Cl.² ........................ C07C 67/30
[58] Field of Search .......... 260/468 H, 514 H

[56] References Cited
UNITED STATES PATENTS

| 3,046,299 | 7/1962 | Julia | 260/468 |
| 3,538,143 | 11/1970 | Matsui et al. | 260/468 |

OTHER PUBLICATIONS

House, Modern Synthetic Reactions, pp. 498, 546–550 (1972).

*Primary Examiner*—Robert Gerstl
*Attorney, Agent, or Firm*—Stewart and Kolasch, Ltd.

[57] ABSTRACT

A process for preparing alkyl trans-chrysanthemate which comprises treating the corresponding cis-isomer with a catalyst selected from the group consisting of (1) an alkali metal catalyst, (2) an alkaline catalyst composition prepared by reacting an alkali metal, an alkali metal hydroxide and alumina at a temperature higher than the melting point of the alkali metal and (3) an alkali metal hydride catalyst. By this process, the objective trans-isomer is obtainable in an excellent yield with ease.

11 Claims, No Drawings

PROCESS FOR PREPARING ALKYL TRANS-CHRYSANTHEMATE

The present invention relates to a process for preparing alkyl trans-chrysanthemate, i.e. alkyl 2,2-dimethyl-3-(2′-methyl)-1′-propenyl-1,3-trans-cyclopropane-1-carboxylate. More particularly, it relates to a process for preparing the said tran-isomer from the corresponding cis-isomer, i.e. alkyl 2,2-dimethyl-3-(2′-methyl)-1′-propenyl-1,3-cis-cyclopropane-1-carboxylate, by the use of certain catalysts.

It is known that chrysanthemic acid is the acid component of the esters known as the so-called "pyrethroidal insecticides" such as pyrethrin, allethrin and phthalthrin. It is also known that the pyrethroids having the residue of trans-chrysanthemic acid as the acid component generally exhibit a higher insecticidal activity than those having the residue of cis-chrysanthemic acid as the acid component. Thus, the use of the tran-sisomer of chrysanthemic acid for the production of pyrethroids is more advantageous and favorable than that of the corresponding cis-isomer.

For the production of alkyl chrysanthemate, there has heretofore been widely adopted the reaction of 2,5-dimethyl-2,4-hexadiene with alkyl diazoacetate. However, the product in this reaction is a mixture of alkyl cis-chrysanthemate and alkyl trans-chrysanthemate. Because of this reason, the conversion of the cis-isomer thus produced into the corresponding trans-isomer is necessary in order to increase the economical efficiency.

As the method for achieving such conversion, there are known: (1) the treatment of the cis-isomer with a not less than equal molar amount of alkali tertiary alkoxide in benzene while heating [French patent No. 1,203,902], (2) the heating of the cis-isomer in the presence of a catalytic amount of alkali metal alkoxide in a primary alcohol at 150° to 200°C [Japanese patent No. 6457/65], and (3) the thermal isomerisation of the cis-isomer [Chemistry & Industry, 1970, 1050]. These known procedures are disadvantageous in requiring a relatively large amount of expensive alkali metal tertiary alkoxide, an autoclave for a high pressure in the reaction, a drastic condition such as heating up to almost the decomposition temperature of alkyl chrysanthemate which results in the unavoidable production of by-products, etc.

It has now been found that some certain catalysts can convert alkyl cis-chrysanthemate into the corresponding alkyl trans-chrysanthemate in an excellent yield with ease.

According to the present invention, there is provided a process for preparing alkyl trans-chrysanthemate which comprises the corresponding cis-isomer with a catalyst selected from the group consisting of (1) an alkali metal catalyst, (2) an alkaline catalyst composition prepared by reacting an alkali metal, an alkali metal hydroxide and alumina at a temperature higher than the melting point of the alkali metal and (3) an alkali metal hydride catalyst.

1. The term "alkali metal catalyst" is intended to mean an alkali metal processed in any form suitable for exertion of the catalytic activity. As the alkali metal, there may be used any one belonging to Group I of the periodic table, for instance, lithium, sodium, potassium, rubidium, or alloys thereof.

For the efficient use of the alkali metal, it may be deposited on an appropriate solid carrier such as alumina, silica gel, aluminum silicate or activated carbon, dispersed in a liquid medium such as toluene, xylene, liquid paraffin, naphthalene, anthracene or mineral oil or dissolved in a suitable solvent such as ammonia or an amine (e.g. ethylenediamine). It is known that an alkali metal can form a soluble, colored complex when treated with an aromatic hydrocarbon (e.g. naphthalene, anthracene, phenanthrene) and an ether (e.g. dimethyl ether, tetrahydrofuran, ethyleneglycol dimethyl ether) [J. AM. Chem. Soc., 58, 2442 (1936)]. Such complex is also utilizable as the alkali metal catalyst in this invention.

The solid carrier is preferred to have a surface area of at least about 25 $m^2$ per 1 gram. A higher surface area is more effective, and no restriction is present on the upper limit. For the preparation of a suitable catalyst, the said alkali metal is deposited on the solid carrier at a temperature higher than the melting point of the alkali metal. Particularly when alumina is employed as the solid carrier, a highly active catalyst can be obtained by preparing at a temperature from 200° to 500°C. The preparation of the catalyst is effected under the atmosphere of an inert gas such as nitrogen, helium or argon. The amount of the alkali metal to be used is usually from 1 to 20 % by weight, favorably from 5 to 10 % by weight, based on the weight of the solid carrier.

An alkali metal deposited on a solid carrier is known to be useful as a catalyst effective in the isomerization of olefins such as butenes [J. Am. Chem. Soc., 82, 387 (1960)]. However, it has never been known that such catalyst is effective in the isomerization of alkyl cis-chrysanthemate into the corresponding trans-isomer almost quantitatively.

2. The term "alkaline catalyst composition" is intended to mean the one prepared by heating an alkali metal, an alkali metal hydroxide and alumina at a temperature higher than the melting point of the alkali metal.

As the alkali metal, there may be used any one belonging to Group I of the periodic table as mentioned above. The alkali metal hydroxide is not necessarily required to correspond to the said alkali metal. Thus, the combination of the alkali metal and the alkali metal hydroxide to be employed may be, for instance, lithium and lithium hydroxide, sodium and sodium hydroxide, potassium and potassium hydroxide or rubidium and rubidium hydroxide as well as lithium and sodium hydroxide, sodium and potassium hydroxide or lithium and potassium hydroxide. The alumina may be, for instance, α-alumina, -alumina θ-alumina, δ-alumina, γ-alumina, η-alumina, χ-alumina or ρ-alumina. There may be also used such an alumina-containing material as alumina silicate for the source of alumina. Usually, however, the use of alumina itself is much favorable. Particularly, γ-alumina of 100 to 300 mesh in particle size affords the highest catalytic activity.

The amount of the alkali metal hydroxide to the alumina is not limitative but is normally preferred to be 1/200 to 1 part by weight to one part by weight of the latter. The alkali metal may be employed in an optional amount, favorably from 1/50 to 1/5 part by weight to one part by weight of the alumina.

For preparation of the catalyst, the said materials, i.e. the alkali metal, the alkali metal hydroxide and the alumina, are heated at a temperature higher than the melting point of the alkali metal (usually not lower than 200°C, preferably from 350° to 500°C), ordinarily in an inert gas such as nitrogen, helium or argon while stirring. The reaction time is associated with the temperature of heating and may be usually from 1 to 30 hours. At a high temperature, the reaction time becomes necessarily short.

In an alternative procedure, the preparation of the catalyst may be started with the use of the alkali metal and an alumina having water removable therefrom, i.e. without using the alkali metal hydroxide. The term "removable water" hereinabove used is intended to mean not only movable water itself but also structural water and hydroxyl groups which can be eliminated in the form of water, inclusively. Thus, the alumina herein utilizable may be any alumina other than α-alumina which is considered to include no removable water. The water content is such utilizable alumina may be usually from 1.3 to 15 % by weight, favorably from 1.7 to 10 % by weight. The alkali metal is employed in an amount larger than that which can consume completely the water in the starting alumina, preferably 1.01 to 2 times the amount which can use up such water.

The said alternative procedure may be understood to be substantially the same as the previous procedure and falling within the scope of this invention, because the reaction is assumed to proceed as follows: a portion of the alkali metal is first reacted with the water removed from the alumina to produce the corresponding alkali metal hydroxide and then the remaining portion of the alkali metal, the produced alkali metal hydroxide and the resultant alumina are reacted with each other.

When the reaction of the alkali metal, the alkali metal hydroxide and the alumina according to this invention is carried out insufficiently and incompletely, the resulting composition may include unreacted alkali metal. The catalytic activity of such composition is inferior to that of the catalyst obtained by the complete proceeding of the reaction but still has a certain catalytic activity and is utilizable in this invention.

The alkali catalyst composition is known to be useful as an isomerization catalyst for olefins [French Pat. No. 2,103,221]. However, its catalytic activity in the conversion of alkyl cis-chrysanthemate into the corresponding transisomer has never been known.

3. The term "alkali metal hydride catalyst" is intended to mean an alkali metal hydride processed in any form suitable for exertion of the catalytic activity. As the alkali metal hydride, there may be used the hydride of any alkali metal belonging to Group I of the periodic table as mentioned above. Specific examples are lithium hydroxide, sodium hydride, potassium hydride, etc. Among them, particularly preferred is sodium hydride. The alkali metal hydride may be employed in any form but the use in a finely pulverized form is favored.

An alkali metal hydride is known to be an excellent ester condensation reagent. But in the process of this invention, the alkali metal hydride withdraws a hydrogen atom at the 1-position, whereby the conversion of the cis-isomer into the trans-isomer proceeds quantitatively, without causing any reaction about the ester group. It is particularly notable that the quantitative isomerization can be accomplished by the use of the alkali metal hydride in a catalytic amount.

The alkyl cis-chrysanthemate to be used in this invention is representable by the formula:

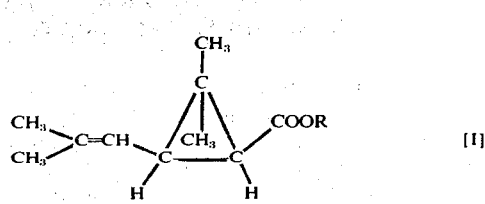

wherein R is a lower alkyl group.

The term "lower alkyl" hereinabove used is usually intended to mean the one having 1 to 8 carbon atoms and includes specifically methyl, ethyl, n-propyl, iso-propyl, n-butyl, isobutyl, t-butyl, etc. Since the increase in the number of the carbon atoms of the lower alkyl group results in the decrease of the isomerization efficiency, methyl and ethyl are particularly preferred.

The starting cis-isomer [I] may be used alone or together with the corresponding trans-isomer, i.e. alkyl transchrysanthemate, which is representable by the formula:

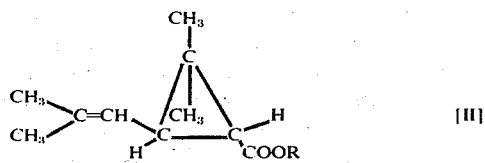

wherein R is as defined above.

Concerning to the amount of the catalyst with respect the starting cis-isomer [I] or its mixture with the corresponding trans-isomer [II], no strict limitation is present, and it may be appropriately decided depending on the reaction time, the kind of the catalyst and the like. Usually, the catalyst may be used in a proportion of 1/1000 to 1 mol (based on the alkali metal) per 1 mol of the starting cis-isomer [I] or its mixture with the trans-isomer [II]. Particularly preferred is 1/100 to 1/5 mol of the catalyst (based on the alkali metal) per 1 mol of the starting ester to be treated.

The process of this invention may be carried out batchwise or continuously. The reaction can proceed without any correlation to the pressure. When effected under an atmospheric pressure, the starting ester may be introduced into the reactor together with the catalyst. If desired, the starting ester may be added into the reactor continuously or intermittently depending on the proceeding of the reaction. The reaction temperature is usually from about 50° to 200°C, preferably from 70° to 180°C. In case of the reaction temperature being considerably higher than 200°C, unfavorable phenomena such as decomposition of the starting ester will be observed. The reaction may proceed quantitatively without using any solvent but, if desired, a non-retarding solvent such as an aliphatic hydrocarbon (e.g. hexane, heptane, isopentane, decalin, dodecane), an ether (e.g. tetrahydrofuran, dioxane) or an aromatic hydrocarbon (e.g. benzene, toluene, xylene) may be employed.

In order to accomplish the isomerization more safely and surely, the adoption of an inert gas atmosphere is recommended. It is also recommendable to eliminate sufficiently the water which may be contained in the starting ester prior to its contact with the catalyst. For effecting such dehydration, there may be used any conventional drying agent such as alumina and silica gel.

In case of the alkali metal hydride catalyst being employed, the alkali metal hydride itself may act as a dehydrating agent and then the isomerization will be initiated. Because of this reason, the elimination of the water in the starting ester is not necessarily required.

The reaction time is associated with the amount of the catalyst, the reaction temperature and the like. In general, a higher reaction temperature results in a shorter reaction time. Insofar as the reaction is carried out within the range of the reaction temperature as mentioned above, any strict regulation on the reaction time is unnecessary.

The proceeding of the reaction may be checked by a per se conventional procedure such as gas chromatography, IR absorption spectrum or the like.

After the isomerization is completed, the catalyst is eliminated from the reaction mixture by a conventional separation procedure, e.g. filtration or extraction. Then, the product is purified by a conventional procedure such as distillation to give alkyl trans-chrysanthemate of the formula [II]. In alternative, the reaction mixture may be treated with water, an alcohol or an alkaline solution without the separation of the catalyst and then subjected to hydrolysis whereby trans-chrysanthemic acid is obtained.

Practical and presently preferred embodiments of the present invention are illustratively shown in the following Examples.

Preparations of the catalyst:-

Procedure A

In a 200 ml volume flask, there was charged alumina (100 g) calcined at 500°C for 2 hours, and it was heated at 400°C under a nitrogen atmosphere while stirring. After the addition of metallic sodium (10 g) at the same temperature as above, the resultant mixture was stirred for 2 hours to give a catalyst.

Procedure B

As in Procedure A, there was prepared a catalyst from alumina (100 g) and metallic sodium (5 g).

Procedure C

As in Procedure A, there was prepared a catalyst from alumina (100 g) and metallic potassium (4 g).

Procedure D

In a 200 ml volume flask, there was charged alumina (100 g) calcined at 500°C for 2 hours, and it was heated at 200°C under a nitrogen atmosphere while stirring. After the addition of metallic sodium (10 g) at the same temperature as above, the resultant mixture was stirred for 1 hour to give a catalyst.

Procedure E

As in Procedure D, there was prepared a catalyst from alumina (100 g) and metallic potassium (10 g).

Procedure F

As in Procedure D, there was prepared a catalyst from silica gel (100 g) and metallic sodium (7 g).

Procedure G

In a 200 ml volume flask, there was charged alumina (100 g), and the alumina was heated at 400°C while stirring. Under a nitrogen stmosphere, sodium hydroxide (12.0 g) was added thereto, and the resultant mixture was stirred for 1 hour. At the same temperature as above, metallic sodium (5.0 g) was further added thereto. The resultant mixture was stirred for 2 hours and allowed to cool to give a catalyst.

Procedure H

As in Procedure G, there was prepared a catalyst from alumina (100 g), sodium hydroxide (2.0 g) and metallic sodium (10.0 g).

Procedure I

As in Procedure G, there was prepared a catalyst from alumina (100 g), sodium hydroxide (1.0 g) and metallic sodium (10.0 g).

Procedure J

As in Procedure G, there was prepared a catalyst from alumina (100 g), sodium hydroxide (17.0 g) and metallic potassium (3.0 g).

Procedure k

As in Procedure G, there was prepared a catalyst from alumina (100 g), potassium hydroxide (24.0 g) and metallic potassium (3.0 g).

Procedure L

In a 200 ml volume flask, there was charged γ-alumina (water content: 6.0 % by weight) (100 g), and the alumina was heated at 200°C while stirring. Under a nitrogen atmosphere, metallic sodium (7.6 g) was added thereto, and the resultant mixture was stirred for 1 hour. After the temperature was set at 400°C, metallic sodium (4.0 g) was additionally added thereto. The resulting mixture was stirred for 3.5 hours and allowed to cool to give a catalyst.

Procedure M

In a 200 ml volume flask, χ-and γ-alumina (water content: 2.0 % by weight) (100 g) was charged and heated to 400°C while stirring. Under a nitrogen atmosphere, metallic sodium (5.0 g) was added thereto, and the resultant mixture was stirred at the same temperature as above for 2 hours to give a catalyst.

Procedure N

As in Procedure M, there was prepared a catalyst from χ- and γ-alumina (water content: 1.6 % by weight) (100 g) and metallic potassium (3.6 g).

Procedure O

In a 200 ml volume flask, ρ-alumina (water content: 8 % by weight) (100 g) was charged and heated to 300°C while stirring. Under a nitrogen atmosphere, metallic sodium (10.5 g) was added thereto, and the resultant mixture was stirred at the same temperature for 1 hour. Then, the temperature was elevated to 400°C, and metallic sodium (4.0 g) was added thereto. The resulting mixture was stirred at the same temperature as above for 2 hours and allowed to cool to give a catalyst.

Procedure P

In a 200 ml volume flask, γ-alumina containing 10 % by weight of boehmite (100 g) was charged, and metallic sodium (3.8 g) was added thereto at 200°C under a nitrogen atmosphere while stirring. Stirring was continued at 200°C for 30 minutes. Then, the resultant mixture was heated at 400°C for 2 hours and allowed to cool to give a catalyst.

EXAMPLE 1

In a 25 ml volume flask, ethyl cis-chrysanthemate (10.0 g) was charged, and metallic sodium (0.1 g) was added thereto under a nitrogen atmosphere. The resulting mixture was heated in an oil bath at 120°C while stirring. Sampling of the reaction mixture was made 10, 30 and 60 minutes after the initiation of the reaction, and the samples were subjected to gas chromatographic analysis. The results are shown in the following Table:

| Reaction time (minutes) | cis-Isomer (% by weight) | trans-Isomer (% by weight) |
| --- | --- | --- |
| 10 | 32.6 | 67.4 |
| 30 | 13.3 | 86.7 |
| 60 | 9.6 | 90.4 |

After completion of the isomerization, a small amount of ethanol was added to the reaction mixture whereby the sodium was inactivated. After the addition of cold water (25 ml), the resultant mixture was shaken with ether (2 × 20 ml). The ether layer was washed with water, dried over anhydrous sodium sulfate and evaporated. The residual solution was distilled under reduced pressure to give ethyl trans-chrysanthemate (9.1 g). B.P. 108° to 110°C/16 mmHg. The product was hydrolyzed by a conventional procedure to give trans-chrysanthemic acid. M.P. 49° to 54°C.

The water layer separated from the ether layer was made acidic with 10 % sulfuric acid, and the separated oil was extracted with ether. After drying and removal of the ether, trans-chrysanthemic acid (0.6 g) was obtained. M.P. 49° to 54°C.

EXAMPLE 2

As in Example 1, a mixture of ethyl cis-chrysanthemate and ethyl trans-chrysanthemate (34.9 : 65.1 by weight) (10.0 g) was reacted with metallic potassium (C.1 g) at 100°C. The results of the gas chromatographic analysis of the reaction mixture sampled 10, 30 and 60 minutes after the initiation of the reaction are shown in the following Table:

| Reaction time (minutes) | cis-Isomer (% by weight) | trans-Isomer (% by weight) |
| --- | --- | --- |
| 10 | 13.2 | 86.8 |
| 30 | 10.1 | 89.9 |
| 60 | 8.1 | 91.9 |

After completion of the isomerization, the reaction mixture was treated as in Example 1 to give ethyl trans-chrysanthemate (9.2 g) and trans-chrysanthemic acid (0.5 g).

EXAMPLE 3

In a 25 ml Volume flask, ethyl cis-chrysanthemate (10.0 g) was charged, and a 40 % sodium dispersion in liquid paraffin (0.35 g) was added thereto under a nitrogen atmosphere. The resulting mixture was heated in a water bath at 100°C while stirring. Sampling of the reaction mixture was made 30, 60 and 120 minutes after the initiation of the reaction, and the samples were subjected to gas chromatographic analysis. The results are shown in the following Table:

| Reaction time (minutes) | cis-Isomer (% by weight) | trans-Isomer (% by weight) |
| --- | --- | --- |
| 30 | 24.3 | 75.7 |
| 60 | 9.5 | 90.5 |
| 120 | 9.2 | 90.8 |

After completion of the isomerization, the reaction mixture was treated as in Example 1 to give ethyl trans-chrysanthemate (9.1 g) and trans-chrysanthemic acid (0.4 g).

EXAMPLE 4

In a 35 ml volume flask, ethyl cis-chrysanthemate (15.0 g) was charged, and a 15.2 % sodium dispersion in naphthalene (0.75 g) was added thereto under a nitrogen atmosphere. The resulting mixture was heated in an oil bath at 120°C while stirring. Sampling of the reaction mixture was made 10, 30, 60 and 90 minutes after the initiation of the reaction, and the samples were subjected to gas chromatographic analysis. The results are shown in the following Table:

| Reaction time (minutes) | cis-Isomer (% by weight) | trans-Isomer (% by weight) |
| --- | --- | --- |
| 10 | 91.2 | 8.8 |
| 30 | 61.5 | 38.5 |
| 60 | 13.4 | 86.6 |
| 90 | 9.0 | 91.0 |

After completion of the isomerization, a small amount of ethanol was added to the reaction mixture whereby the catalyst was inactivated. After the addition of a 25 % aqueous sodium hydroxide solution in water (18 g), the resultant mixture was refluxed for 2 hours and then ethanol was distilled off. The residue was dissolved in cold water and shaken with toluene. The water layer was made acidic with 10 % sulfuric acid, and the separated oil was extracted with n-hexane. The n-hexane extract was washed with water, dried and evaporated. The resulting oil (12.6 g) was cooled and allowed to stand. The solidified crystals, M.P. 49° to 53°C, were purified by distillation under reduced pressure to give trans-chrysanthemic acid. B.P. 111° to 115°C/1 mmHg.

EXAMPLE 5

In a 200 ml volume flask, anhydrous dioxane (20 ml) was charged, and naphthalene (5.09 g) and metallic sodium (0.91 g) were added thereto under a nitrogen atmosphere. The resulting mixture was stirred at room temperature whereby the sodium was dissolved to form a dark green complex. After stirring for 2 hours, a mixture of ethyl cis-chrysanthemate and ethyl trans-chrysanthemate (35.6 : 64.4 by weight) (60.0 g) was added thereto, and the resultant mixture was stirred at 90°C. Sampling of the reaction mixture was made 60, 120 and 240 minutes after the initiation of the reaction, and the samples were subjected to gas chromatographic analysis. The results are shown in the following Table:

| Reaction time (minutes) | cis-Isomer (% by weight) | trans-Isomer (% by weight) |
|---|---|---|
| 60 | 24.8 | 75.2 |
| 120 | 18.6 | 81.4 |
| 240 | 8.4 | 91.6 |

After completion of the reaction, the reaction mixture was treated as in Example 4 to give trans-chrysanthemic acid (50.0 g). M.P. 50° to 53°C.

EXAMPLE 6

As in Example 4, methyl cis-chrysanthemate (15.0 g) was reacted with a 11.4 % sodium dispersion in anthracene (0.9 g) at 100°C while stirring for 3 hours. The reaction mixture was treated as in Example 4 to give trans-chrysanthemic acid (12.8 g). M.P. 49° to 53°C.

EXAMPLE 7

As in Example 4, n-propyl cis-chrysanthemate (15.0 g) was reacted with a 15.2 % sodium dispersion in naphthalene (1.0 g) at 150°C while stirring for 6 hours. The reaction mixture was treated as in Example 4 to give trans-chrysanthemic acid (11.5 g). M.P. 48 to 53°C.

EXAMPLE 8

In a 200 ml volume flask, a mixture of ethyl cis-chrysanthemate and ethyl trans-chrysanthemate (34.2 : 65.8 by weight) (116.2 g) was charged and, after replacement of the atmosphere by nitrogen, the catalyst prepared as in Procedure A (2.3 g) was added thereto. The resulting mixture was heated on an oil bath at 169° to 170°C while stirring. Sampling of the reaction mixture was made 10, 20, 30, 60, 90 and 120 minutes after the initiation of the reaction, and the samples were subjected to gas chromatographic analysis. The results are shown in the following Table:

| Reaction time (minutes) | cis-Isomer (% by weight) | trans-Isomer (% by weight) |
|---|---|---|
| 10 | 28.0 | 72.0 |
| 20 | 25.5 | 74.5 |
| 30 | 22.1 | 77.9 |
| 60 | 17.9 | 82.1 |
| 90 | 14.6 | 85.4 |
| 120 | 13.0 | 87.0 |

After filtering off the catalyst, the filtrate was distilled under reduced pressure to give ethyl trans-chrysanthemate (111.0 g). B.P. 108° to 110°C/16 mmHg.

EXAMPLE 9

In a 25 ml volume flask, a mixture of ethyl cis-chrysanthemate and ethyl trans-chrysanthemate (34.3 : 65.7 by weight) (8.50 g) was charged and, after replacement of the atmosphere by nitrogen, the catalyst prepared as in Procedure A (0.76 g) was added thereto. The resulting mixture was heated on an oil bath at 133° to 137°C while stirring. Sampling of the reaction mixture was made 30, 60, 120 and 180 minutes after the initiation of the reaction, and the samples were subjected to gas chromatographic analysis. The results are shown in the following Table:

| Reaction time (minutes) | cis-Isomer (% by weight) | trans-Isomer (% by weight) |
|---|---|---|
| 30 | 25.2 | 74.8 |
| 60 | 19.1 | 80.9 |
| 120 | 13.8 | 86.2 |
| 180 | 12.3 | 87.7 |

After filtering off the catalyst, the filtrate was distilled under reduced pressure to give ethyl trans-chrysanthemate (8.00 g). B.P. 107° to 109°C/16 mmHg.

EXAMPLE 10

As in Example 9, a mixture of ethyl cis-chrysanthemate and ethyl trans-chrysanthemate (36.5 : 63.5 by weight) (6.0 g) was reacted with the catalyst prepared as in Procedure A (1.0 g) at 59° to 62°C. The results of the gas chromatographic analysis of the reaction mixture sampled 30, 60, 120, 180 and 240 minutes after the initiation of the reaction are shown in the following Table:

| Reaction time (minutes) | cis-Isomer (% by weight) | trans-Isomer (% by weight) |
|---|---|---|
| 30 | 32.0 | 68.0 |
| 60 | 26.2 | 73.8 |
| 120 | 19.4 | 80.6 |
| 180 | 13.7 | 86.3 |
| 240 | 11.5 | 88.5 |

EXAMPLE 11

In a 25 ml volume flask, ethyl cis-chrysanthemate (5.0 g) was charged and, after replacement of the atmosphere by nitrogen, the catalyst prepared as in Procedure B (0.5 g) was added thereto. The resulting mixture was heated at 168° to 173°C while stirring. The results of the gas chromatographic analysis of the reaction mixture sampled 20, 60 and 120 minutes after the initiation of the reaction are shown in the following Table:

| Reaction time (minutes) | cis-Isomer (% by weight) | trans-Isomer (% by weight) |
|---|---|---|
| 20 | 36.1 | 63.8 |
| 60 | 16.4 | 83.6 |
| 120 | 10.3 | 89.7 |

After filtering off the catalyst, the filtrate was distilled under reduced pressure to give ethyl trans-chrysanthemate (4.5 g). B.P. 107° to 109°C/17 mmHg.

EXAMPLE 12

As in Example 9, a mixture of ethyl cis-chrysanthemate and ethyl trans-chrysanthemate (36.2 : 63.8 by weight) (6.3 g) was reacted with the catalyst prepared as in Procedure C (0.4 g) at 165° to 170°C. The results of the gas chromatographic analysis of the reaction mixture sampled 5, 30 and 90 minutes after the initiation of the reaction are shown in the following Table:

| Reaction time (minutes) | cis-Isomer (% by weight) | trans-Isomer (% by weight) |
| --- | --- | --- |
| 5 | 22.1 | 77.9 |
| 30 | 20.9 | 79.1 |
| 90 | 19.9 | 80.1 |

After filtering off the catalyst, the filtrate was distilled under reduced pressure to give ethyl trans-chrysanthemate (5.6 g). B.P. 107°C/16 mmHg.

EXAMPLE 13

As in Example 9, n-propyl cis-chrysanthemate (5 g) was reacted with the catalyst prepared as in Procedure D (0.7 g) at 170°C for 2 hours. The reaction mixture was filtered to separate the catalyst, and the filtrate was hydrolyzed by a conventional procedure. After neutralization of the reaction mixture, the obtained acidic portion was analyzed by IR absorption spectrum to confirm that it is a mixture of cis-chrysanthemic acid and trans-chrysanthemic acid. By removal of the cis-isomer as dihydro-chrysanthemolactone, there was obtained trans-chrysanthemic acid (2.3 g). M.P. 48° to 53°C.

EXAMPLE 14

As in Example 9, n-butyl cis-chrysanthemate (5 g) was reacted with the catalyst prepared as in Example 9 (0.7 g) at 170° to 172°C for 3 hours. After filtering off the catalyst, the filtrate was hydrolyzed by a conventional procedure. The reaction mixture was treated as in Example 13 to give trans-chrysanthemic acid (1.8 g).

EXAMPLE 15

As in Example 9, ethyl cis-chrysanthemate (5 g) was reacted with the catalyst prepared as in Procedure F (0.6 g) at 170° to 171°C for 90 minutes. The reaction mixture was confirmed to include ethyl cis-chrysanthemate and ethyl trans-chrysanthemate (27.1 : 72.9 by weight).

EXAMPLE 16

In a 25 ml volume reactor, ethyl cis-chrysanthemate (5.0 g) and n-heptane (5 ml) were charged and, after replacement of the atmosphere by nitrogen, the catalyst prepared as in Procedure G (1.0 g) was added thereto. The resulting mixture was stirred at 60°C. The results of the gas chromatographic analysis of the reaction mixture sampled 1, 4, 6 and 7 hours after the initiation of the reaction are shown in the following Table:

| Reaction time (hours) | cis-Isomer (% by weight) | trans-Isomer (% by weight) |
| --- | --- | --- |
| 1 | 79.8 | 20.2 |
| 4 | 29.8 | 70.2 |
| 6 | 14.2 | 85.8 |
| 7 | 11.2 | 88.8 |

After filtering off the catalyst, the filtrate was evaporated to remove n-heptane. The residual oil was distilled under reduced pressure to give ethyl trans-chrysanthemate (4.6 g). B.P. 87°C/5 mmHg.

EXAMPLE 17

In a 200 ml volume flask, a mixture of ethyl cischrysanthemate and ethyl trans-chrysanthemate (32.2 : 67.8 by weight) (114.6 g) was charged and, after replacement of the atmosphere by nitrogen, the catalyst prepared as in Procedure H (1.95 g) was added thereto. The resulting mixture was heated on an oil bath at 169° to 170°C while stirring. The results of the gas chromatographic analysis of the reaction mixture sampled 5, 15, 30 and 60 minutes after the initiation of the reaction are shown in the following Table:

| Reaction time (minutes) | cis-Isomer (% by weight) | trans-Isomer (% by weight) |
| --- | --- | --- |
| 5 | 28.1 | 71.9 |
| 15 | 25.6 | 74.4 |
| 30 | 22.0 | 78.0 |
| 60 | 18.9 | 81.0 |

The same catalyst as above (0.35 g) was additionally added to the reaction mixture, and stirring was further continued. The results of the gas chromatographic analysis of the reaction mixture sampled 5, 15 and 60 minutes thereafter are shown in the following Table:

| Reaction time (minutes) | cis-Isomer (% by weight) | trans-Isomer (% by weight) |
| --- | --- | --- |
| 5 | 16.8 | 83.2 |
| 15 | 14.7 | 85.3 |
| 60 | 13.1 | 86.9 |

After filtering off the catalyst, the filtrate was distilled under reduced pressure to give ethyl trans-chrysanthemate (110.7 g). B.P. 108° to 110°C/16 mmHg.

EXAMPLE 18

In a 200 ml volume flask, a mixture of ethyl cischrysanthemate and ethyl trans-chrysanthemate (37.6 : 62.4 by weight) (100 g) was charged and, after replacement of the atmosphere by nitrogen, the catalyst prepared as in Procedure I (3.0 g) was added thereto. The resulting mixture was heated on an oil bath at 130° to 132°C while stirring. The results of the gas chromatographic analysis of the reaction mixture sampled 15, 65, 120 and 270 minutes after the initiation of the reaction are shown in the following Table:

| Reaction time (minutes) | cis-Isomer (% by weight) | trans-Isomer (% by weight) |
| --- | --- | --- |
| 15 | 33.3 | 66.7 |
| 65 | 18.7 | 81.3 |
| 120 | 11.6 | 88.4 |
| 270 | 9.1 | 90.9 |

After filtering off the catalyst, the filtrate was distilled under reduced pressure to give ethyl trans-chrysanthemate (96 g). B.P. 108° to 110°C/16 mmHg.

EXAMPLE 19

A mixture of n-propyl cis-chrysanthemate (2 g) and the catalyst prepared as in Procedure J (0.8 g) was stirred at 169° to 170°C under a nitrogen atmosphere for 70 minutes. The reaction mixture was treated as in Example 18 and the product was hydrolyzed by a conventional procedure to give an acidic substance, which was partially crystallized. By IR absorption spectrum and gas chromatography, it was confirmed that the acidic substance is a mixture of cis-chrysanthemic acid and trans-chrysanthemic acid (23 : 77 by weight). Removal of the cis-isomer as dihydrochrysanthemolactone from the said mixture afforded trans-chrysanthemic acid (1.04 g). M.P. 48° to 54°C.

EXAMPLE 20

A mixture of n-butyl cis-chrysanthemate (4 g) and the catalyst prepared as in Procedure K (1.2 g) was stirred at 169° to 170°C under a nitrogen atmosphere for 70 minutes. The reaction mixture was treated as in Example 18 and the product was hydrolyzed by a conventional procedure to give an acidic substance, which are partially crystallized. By IR absorption spectrum and gas chromatography, it was confimed that the acidic substance is a mixture of cis-chrysanthemic acid and trans-chrysanthemic acid (29 : 71 by weight). Removal of the cis-isomer as dihydrochrysanthemolactone from the said mixture afforded trans-chrysanthemic (2.05 g).

EXAMPLE 21

In a 20 ml volume flask, ethyl cis-chrysanthemate (3.6 g) was charged and, after replacement of the atmosphere by nitrogen, the catalyst prepared as in Procedure L (1.2 g) was added thereto. The resulting mixture was heated on an oil bath at 167° to 168°C while stirring. The results of the gas chromatographic analysis of the reaction mixture sampled 5, 30, 60 and 90 minutes after the initiation of the reaction are shown in the following Table:

| Reaction time (minutes) | cis-Isomer (% by weight) | trans-Isomer (% by weight) |
| --- | --- | --- |
| 5 | 68 | 32 |
| 30 | 20 | 80 |
| 60 | 13 | 87 |
| 90 | 12.5 | 87.5 |

After filtering off the catalyst, the filtrate was distilled under reduced pressure to give ethyl trans-chrysanthemate (3.4 g). B.P. 106° to 110°C/17 mmHg.

EXAMPLE 22

As in Example 21, a mixture of ethyl cis-chrysanthemate and ethyl trans-chrysanthemate (33.9 : 66.1 by weight) (5.4 g) was reacted with the catalyst prepared as in Procedure M (0.6 g) at 168° to 173°C. The results of the gas chromatographic analysis of the reaction mixture sampled 5 and 60 minutes after the initiation of the reaction are shown in the following Table:

| Reaction time (minutes) | cis-Isomer (% by weight) | trans-Isomer (% by weight) |
| --- | --- | --- |
| 5 | 16.4 | 83.6 |
| 60 | 10.3 | 89.7 |

After filtering off the catalyst, the filtrate was distilled under reduced pressure to give ethyl trans-chrysanthemate (4.7 g). B.P. 107° to 109°C/17 mmHg.

EXAMPLE 23

As in Example 21, n-propyl cis-chrysanthemate (4 g) was reacted with the catalyst prepared as in Procedure N (0.6 g) at 168° to 172°C for 2 hours. After filtering off the catalyst, the filtrate was subjected to hydrolysis by a conventional procedure. The obtained acidic substance was partly crystallized. By IR absorption spectrum, the product was confirmed to be a mixture of cis-chrysanthemic acid and trans-chrysanthemic acid. Removal of the cis-isomer as dihydrochrysanthemolactone from the mixture afforded trans-chrysanthemic acid (2.2 g). M.P. 48° to 54°C.

EXAMPLE 24

In a 50 ml volume flask, there was charged a mixture of ethyl cis-chrysanthemate and ethyl trans-chrysanthemate (33 : 67 by weight) (18 g). After replacement of the atmosphere by nitrogen, the catalyst prepared as in Procedure O (5.1 g) was added thereto, and the resultant mixture was heated on an oil bath at 127° to 132°C while stirring. The results of the gas chromatographic analysis of the reaction mixture sampled 30, 60, 120, 180, 240 and 300 minutes after the initiation of the reaction are shown in the following Table:

| Reaction time (minutes) | cis-Isomer (% by weight) | trans-Isomer (% by weight) |
| --- | --- | --- |
| 30 | 33 | 67 |
| 60 | 30 | 70 |
| 120 | 23 | 77 |
| 180 | 17 | 83 |
| 240 | 14 | 86 |
| 300 | 12.2 | 87.8 |

After filtering off the catalyst, the filtrate was distilled under reduced pressure to give ethyl trans-chrysanthemate (17.1 g). B.P. 107° to 110°C/16 mmHg.

EXAMPLE 25

As in Example 21, n-butyl cis-chrysanthemate (5 g) was reacted with the catalyst prepared as in Procedure P (1.0 g) at 170° to 172°C for 2 hours. After filtering off the catalyst, the filtrate was subjected to hydrolysis by a conventional procedure. Removal of cis-chrysanthemic acid as dihydrochrysanthemolactone from the reaction mixture afforded transchrysanthemic acid (1.6 g). M.P. 47° to 53°C.

EXAMPLE 26

In a 35 ml volume flask equipped with a reflux condenser, ethyl cis-chrysanthemate (15.0 g) and sodium hydride (0.2 g) were charged, and the resultant mixture was stirred at 170°C under a nitrogen atmosphere. The results of the gas chromatographic analysis of the reaction mixture sampled 10, 20, 30 and 60 minutes after the initiation of the reaction are shown in the following Table:

| Reaction time (minutes) | cis-Isomer (% by weight) | trans-Isomer (% by weight) |
| --- | --- | --- |
| 10 | 94.0 | 6.0 |
| 20 | 82.2 | 17.8 |
| 30 | 63.2 | 36.8 |
| 60 | 11.8 | 88.2 |

The reaction mixture was subjected to distillation under reduced pressure without separation of the catalyst to give ethyl trans-chrysanthemate (14.5 g). B.P. 87°C/5 mmHg. The product was hydrolyzed by a conventional procedure to give trans-chrysanthemic acid. M.P. 48° to 53°C.

EXAMPLE 27

The reaction was effected as in Example 26 but changing the reaction temperature. The results are shown in the following Table:

| Reaction temperature (°C) | trans-Isomer (% by weight) | | | |
|---|---|---|---|---|
| | 30 minutes | 60 minutes | 120 minutes | 180 minutes |
| 120 | 8.0 | 24.0 | 51.7 | 74.4 |
| 130 | 15.3 | 46.0 | 83.5 | 89.5 |
| 140 | 18.5 | 65.7 | 89.0 | — |
| 150 | 26.0 | 77.5 | 88.7 | — |
| 170 | 36.8 | 88.2 | — | — |

EXAMPLE 28

In a 200 ml volume flask, a mixture of ethyl cis-chrysanthemate and ethyl trans-chrysanthemate (34.7 : 65.3 by weight) (100 g) was charged and, after replacement of the atmosphere by nitrogen, a 53 % sodium hydride dispersion in mineral oil (2.0 g) was added thereto. The resulting mixture was heated on an oil bath at 169° to 170°C while stirring. The results of the gas chromatographic analysis of the reaction mixture sampled 10, 20, 30 and 60 minutes after the initiation of the reaction are shown in the following Table:

| Reaction time (minutes) | cis-Isomer (% by weight) | trans-Isomer (% by weight) |
|---|---|---|
| 10 | 22.5 | 77.5 |
| 20 | 12.8 | 87.2 |
| 30 | 10.8 | 89.2 |
| 60 | 10.7 | 89.3 |

The reaction mixture was subjected to distillation under reduced pressure without separation of the catalyst to give ethyl trans-chrysanthemate (95.5 g). B.P. 108° to 110°C/16 mmHg.

EXAMPLE 29

The reaction was effected as in Example 28 but changing the reaction temperature. The results are shown in the following Table:

| Reaction temperature (°C) | trans-Isomer (% by weight) | | | | Yield (%) |
|---|---|---|---|---|---|
| | 30 minutes | 60 minutes | 120 minutes | 180 minutes | |
| 120 | 64.8 | 68.0 | 73.6 | 78.9 | 96.2 |
| 130 | 67.6 | 77.4 | 86.7 | 89.9 | 95.5 |
| 140 | 72.9 | 85.5 | 90.0 | 91.8 | 93.8 |
| 150 | 81.8 | 89.4 | 89.8 | — | 95.7 |

EXAMPLE 30

The reaction was effected as in Example 28 but changing the amount of sodium hydride. The results are shown in the following Table:

| Amount of catalyst (g) | Reaction temperature (°C) | Reaction time (minutes) | Isomerization (%) | Yield (%) |
|---|---|---|---|---|
| 1.0 | 140 – 141 | 240 | 88.9 | 94.0 |
| 3.0 | 140 – 141 | 120 | 90.2 | 93.1 |
| 5.0 | 140 – 141 | 30 | 91.0 | 92.6 |

Example 31

As in Example 26, n-propyl cis-chrysanthemate (15.0 g) was isomerized with potassium hydride (1.0 g). The isomerization was completed within 120 minutes. The reaction mixture was subjected to hydrolysis by a conventional procedure. The acidic substance was confirmed to be a mixture of cis-chrysanthemic acid and trans-chrysanthemic acid (21 : 79 by weight) by IR absorption spectrum and gas chromatography.

EXAMPLE 32

As in Example 26, n-butyl cis-chrysanthemate (7.0 g) was isomerized with sodium hydride (0.7 g). After 60 minutes, the reaction mixture was subjected to gas chromatographic analysis whereby it was confirmed that the mixture contains the cis-isomer and the trans-isomer in a weight ratio of 25 : 75. The mixture was hydrolyzed by a conventional procedure and cis-chrysanthemic acid was removed as dihydrochrysanthemolactone to give trans-chrysanthemic acid (3.9 g).

What is claimed is:

1. A process for preparing an alkyl trans-chrysanthemate which comprises treating the corresponding cis-isomer with a catalyst selected from the group consisting of (1) an alkali metal catalyst, (2) an alkaline catalyst composition prepared by heating alumina, an alkali metal hydroxide in an amount of from about 1/200 to 1 part by weight with respect to one part by weight of the alumina and an alkali metal in an amount of from about 1/50 to 1/5 part by weight with respect to one part by weight of the alumina at a temperature higher than the melting point of the alkali metal and (3) an alkali metal hydride catalyst in an amount of from about 1/1000 to ½ mol of catalyst, based on the alkali metal, per 1 mol of the starting cis-isomer at a temperature of from about 50° to 200°C.

2. The process according to claim 1, wherein the treatment is effected in a solvent selected from the group consisting of aliphatic hydrocarbons, ethers and aromatic hydrocarbons.

3. The process according to claim 1, followed by hydrolysis of the resulting alkyl trans-chrysanthemate to the corresponding free acid.

4. The process according to claim 1, wherein a mixture of the starting cis-isomer together with the corresponding transisomer is employed.

5. The process according to claim 1, wherein the alkali metal catalyst is deposited on a solid carrier.

6. The process according to claim 1, wherein the alkali metal catalyst is dispersed in a liquid medium selected from the group consisting of toluene, xylene, liquid paraffin, naphthalene, anthracene and mineral oil.

7. The process according to claim 1, wherein the alkali metal catalyst is a complex obtained by treating the alkali metal with an aromatic hydrocarbon and an ether.

8. The process according to claim 1, wherein the alkali metal hydride catalyst is employed in a finely pulverized form.

9. The process according to claim 1, wherein the alkali metal hydride is sodium hydride.

10. The process according to claim 1, wherein the treatment is effected in the presence of a solvent selected from the group consisting of hexane, heptane, isopentane, decalin, dodecane, tetrahydrofuran, dioxane, benzene, toluene and xylene.

11. The process according to claim 1, wherein the reaction temperature is from about 70°C. to 180°C.

* * * * *

UNITED STATES PATENT OFFICE
CERTIFICATE OF CORRECTION

Patent No. 3,906,026          Dated September 16, 1975

Inventor(s) Tsuneyuki Nagase et al

It is certified that error appears in the above-identified patent and that said Letters Patent are hereby corrected as shown below:

In the list of inventors: [75] change "Yukio Yoneyshi" to

--Yukio Yoneyoshi--

Signed and Sealed this seventeenth Day of February 1976

[SEAL]

Attest:

RUTH C. MASON
*Attesting Officer*

C. MARSHALL DANN
*Commissioner of Patents and Trademarks*